US008969460B2

(12) United States Patent
Gijsman et al.

(10) Patent No.: US 8,969,460 B2
(45) Date of Patent: *Mar. 3, 2015

(54) HEAT STABILIZED MOULDING COMPOSITION

(71) Applicant: DSM IP Assets B.V., Heerlen (NL)

(72) Inventors: Pieter Gijsman, Beek (NL); Wilhelmus J. M. Sour, Maastricht (NL); Rudy Rulkens, Cadier en Keer (NL); Robert H. C. Janssen, Elsloo (NL)

(73) Assignee: DSM IP Assets B.V., Heerlen (NL)

( * ) Notice: Subject to any disclaimer, the term of this patent is extended or adjusted under 35 U.S.C. 154(b) by 0 days.

This patent is subject to a terminal disclaimer.

(21) Appl. No.: 14/288,174

(22) Filed: May 27, 2014

(65) Prior Publication Data

US 2014/0275385 A1    Sep. 18, 2014

Related U.S. Application Data

(63) Continuation of application No. 11/795,140, filed as application No. PCT/EP2006/000235 on Jan. 12, 2006, now Pat. No. 8,772,394.

(30) Foreign Application Priority Data

Jan. 17, 2005  (EP) .................................... 05075077

(51) Int. Cl.
  *C08K 3/22*    (2006.01)
  *C08L 77/00*   (2006.01)
  *C08K 3/00*    (2006.01)
  *C08K 5/00*    (2006.01)

(52) U.S. Cl.
  CPC ............... *C08L 77/00* (2013.01); *C08K 3/0041* (2013.01); *C08K 3/22* (2013.01); *C08K 5/005* (2013.01)
  USPC ............ 524/431; 524/413; 524/430; 524/538

(58) Field of Classification Search
  CPC ........ C08K 3/0041; C08K 3/22; C08L 77/00; C08L 77/04; C08L 77/06
  USPC .................. 524/413, 430, 431, 538
  See application file for complete search history.

(56) References Cited

U.S. PATENT DOCUMENTS

| | | | |
|---|---|---|---|
| 2,705,227 A | 3/1955 | Stamatoff |
| 3,923,726 A | 12/1975 | Benz |
| 3,974,120 A | 8/1976 | Razzano et al. |
| 4,220,695 A | 9/1980 | Ishida et al. |
| 4,248,763 A | 2/1981 | Yoshimura et al. |
| 4,297,453 A | 10/1981 | Coran et al. |
| 4,853,425 A | 8/1989 | Yoshimura et al. |
| 5,145,904 A | 9/1992 | Muehlbach et al. |
| 5,256,326 A | 10/1993 | Kuwato et al. |
| 5,350,558 A | 9/1994 | Kuwato et al. |
| 5,459,189 A | 10/1995 | Hagimori et al. |
| 5,627,258 A | 5/1997 | Takayama et al. |
| 5,674,952 A | 10/1997 | Onishi et al. |
| 6,198,377 B1 | 3/2001 | Yamazaki et al. |
| 6,441,072 B1 | 8/2002 | Havenith et al. |
| 6,833,429 B1 | 12/2004 | Pophusen et al. |
| 6,838,494 B2 | 1/2005 | Chundury et al. |
| 6,951,896 B2 | 10/2005 | Ottenheijm |
| 7,763,674 B2 | 7/2010 | Gijsman et al. |
| 2001/0008914 A1 | 7/2001 | Osawa et al. |
| 2002/0045688 A1 | 4/2002 | Galli et al. |
| 2004/0242737 A1 | 12/2004 | Topulos |
| 2005/0250886 A1 | 11/2005 | Stoeppelmann et al. |
| 2008/0146717 A1* | 6/2008 | Gijsman et al. ............... 524/431 |
| 2008/0262133 A1 | 10/2008 | Eibeck et al. |

FOREIGN PATENT DOCUMENTS

| CA | 2 014 243 | 10/1990 |
|---|---|---|
| CA | 2 347 258 | 4/2000 |

(Continued)

OTHER PUBLICATIONS

STANYL® Diablo: The polyamide with revolutionary high temperature oxidative stability, http://www.dsm.com/le/en_US/stanyl/html/diablo.htm (2012).
"Das Rosten von Eisen (The rusting of iron)," www.schulestudium.de, Germany, pp. 1-2.
Rompp Lexikon Chemie, Georg Thieme Verlag Stuttgart, New York, pp. 1096-1097.
International Search Report mailed Apr. 18, 2006 in PCT/EP2006/000235.
Weber, J. N. 2011. Polyamides. Kirk-Othmer Encyclopedia of Chemical Technology. 1-63 (2011).
Allen et al, Polymer Degradation and Stability 23 (1989) 165-174.
Day et al, Polymer Degradation and Stability 46 (1995) 341-349.
STANYL® Diablo: The polyamide with revolutionary high temperature oxidative stability, http://www.dsm.corn/le/en_US/stanyl/html/diablo.htm (2012).

(Continued)

*Primary Examiner* — Vickey Nerangis
(74) *Attorney, Agent, or Firm* — Nixon & Vanderhye P.C.

(57) ABSTRACT

A thermostabilized thermoplastic molding composition includes a) a thermoplastic polyamide composition which consists of a blend of at least two polyamides. The at least two polyamides include a1) at least 50 mass %, relative to the total mass of the thermoplastic polyamide composition, of a first polyamide (PA-1) selected from the group consisting of polyamide-4,6, polyamide-6,6 and semi-aromatic polyamides and mixtures thereof; and a2) an amount of 1-50 mass %, relative to the total mass of the thermoplastic polyamide composition, of a second polyamide (PA-2) selected from the group consisting of polyamide-6 and copolymers thereof. The composition also contains b) 0.001-3 mass %, relative to the total mass of the thermoplastic polyamide composition, of a copper salt; and c) 0.01-10 mass %, relative to the total mass of the thermoplastic polyamide composition, of iron oxide. The molding composition exhibits reduced deterioration when exposed to an elevated temperature of 230° C. for a prolonged time period of 1000 hours as compared to an identical molding composition including a CuI/KI stabilization system but not including the iron oxide.

8 Claims, No Drawings

(56) References Cited

FOREIGN PATENT DOCUMENTS

| | | |
|---|---|---|
| DE | 197 05 998 | 8/1998 |
| DE | 197 14 900 | 10/1998 |
| DE | 100 08 473 | 8/2001 |
| EP | 0 287 045 | 10/1988 |
| EP | 0 392 602 | 10/1990 |
| EP | 0 437 851 | 7/1991 |
| EP | 0 505 162 | 9/1992 |
| EP | 0 761 461 | 3/1997 |
| EP | 1 121 388 | 8/2001 |
| EP | 1 262 525 | 12/2002 |
| GB | 1 225 860 | 3/1971 |
| GB | 1 552 096 | 9/1979 |
| WO | 98/36022 | 8/1998 |
| WO | 00/22035 | 4/2000 |

OTHER PUBLICATIONS

Chernukhina et al, "Properties and Use of Chemical Fibres", Fibre Chemistry, vol. 25 No. 6, Nov.-Dec. 1993, pp. 468-473.

Mitsubishi Gas Chemical Co., Inc., "Physical Properties of Nylon-MXD6, Gas Barrier Technologies," 2009.

Day et al, "Degradation of contaminated plastics: a kinetic study," Polymer Degradation and Stability, Elsevier Science Limited, Canada, 1995, pp. 341-349.

Uegaki et al, "Thermal Dehydrochlorination of Poly(vinyl Chloride)," Journal of Applied Polymer Science, vol. 21, 1977, Japan, pp. 965-973.

Baker Jr. et al, "Thermal degradation of commercial fluoropolymers in air," Poly Degradation and Stability, vol. 42, 1993, USA, pp. 181-188.

Karstens, "Thermo-oxidative degradation of polyamide 6 and 6,6," Makromol. Chem. 190, 1989, Germany, pp. 3033-3053.

Mitsubishi Gas Chemical Co., Inc., "Various Grades and Uses [Nylon-MXD6]," 2007, pp. 1-2.

Kohan, "Commercial Nylon Plastics and Their Applications," Nylon Plastics Handbook, Hanser/Gardner Publications, ISBN 3-446-17048-0, USA, 1995, pp. 566-567.

Mitsubishi Gas Chemical Co., Inc., "MX Nylon," EnplaNet: Information, EnplaNet.com, 2000-2011, pp. 1-4.

Doudou et al, "Crystallization and Melting Behaviour of Poly($m$-Xylene Adipamide)," J. Therm. Anal. Cal., 85, 2006, pp. 409-415.

Oberbach, Saechtling—Kunststoff Taschenbuch (Plastics Handbook), 28$^{th}$ Edition, Hanser, Germany, 2001, pp. 490 and 494.

Römpp Lexikon Chemie, Georg Thieme Verlag Stuttgart, New York, pp. 1096-1097, 1997.

Janssen et al, "Mechanistic aspects of the stabilization of polyamides by combinations of metal and halogen salts," Polymer Degradation and Stability, 49, Elsevier Science Limited, 1995, pp. 127-133.

Miyamoto, "Nylon MXD6", Polymer Data Handbook, Oxford University Press, Inc., USA, 1999, pp. 230-232.

\* cited by examiner

HEAT STABILIZED MOULDING COMPOSITION

This application is a continuation of commonly owned U.S. application Ser. No. 11/795,140, filed Feb. 13, 2008 (now U.S. Pat. No. 8,772,394), which is the U.S. national phase of International Application No. PCT/EP2006/000235 filed Jan. 12, 2006 which designated the U.S. and claims priority to EP Application No. 05075077.7 filed Jan. 12, 2006, the entire contents of each of which are hereby incorporated by reference.

The invention relates to a thermostabilized thermoplastic moulding composition comprising a thermoplastic polyamide composition and a heat stabilizing system. The invention in particular relates to thermostabilized thermoplastic polyamide moulding compositions comprising a thermostabilizer selected from the group consisting of phenolic thermostabilizers, organic phosphites, aromatic amines, metal salts of metals chosen from the group consisting of elements from Group IB, IIB, III and IV of the Periodic Table and alkali and alkali earth metal halides, and combinations thereof, and to moulded thermoplastic articles made of these compositions for use in high temperature applications.

A high-temperature-use application for a moulded article is herein understood to be an application wherein the moulded article during its normal useful lifetime is in contact with a heat source which frequently attains and/or which attains for a longer period a temperature of at least 140° C. The heat source may be a heat producing device or a heated device or may be the surrounding environment wherein the moulded article is subjected to conditions with temperatures of at least 140° C. Such high-temperature-use applications are regularly met for articles used in the electro-electronic, and automotive industry. Examples of heated devices or heat generating devices are engines, or elements thereof, and electronic devices such as semi-conductors. For the automotive segment high-temperature-use application are regularly found in so-called under-the-hood or under-the bonnet applications, herein referred to as automotive parts. Therefore, the invention in particular relates to moulded articles for use in the electro-, electronic, and automotive industry.

Moulded articles for the electro, electronic and automotive industry and moulding compositions based on thermoplastic materials used for these applications generally have to comply with a complex property profile, including, for the compositions as moulded, good dimensional stability, high heat distortion temperature (HDT) and good mechanical properties, including a high tensile strength and a high tensile modulus. As indicated above, moulded articles that serve in automotive under-the-hood applications in several electric or electronic applications can be subjected to relatively high temperatures for a prolonged period. Therefore it is required that the moulding compositions used in these applications have a good thermal stability over extended periods of time at elevated temperature. Non-stabilized thermoplastic moulding compositions generally tend to show a decrease in mechanical properties due to thermal degradation of the polymer. This effect is called heat ageing. This effect can occur to an undesirable extent. In particular with polyamides as the thermoplastic polymer, the deteriorating effect of exposure to high temperatures can be very dramatic. Generally the materials used for the indicated applications contain a heat stabilizer, also referred to as thermostabilizer. The function of a heat stabilizer is to better retain the properties of the composition upon exposure of the moulded article to elevated temperature. When using a heat stabilizer, the useful lifetime of the moulded material can be extended significantly, depending on the type of material, use conditions and type and amount of heat stabilizer or thermostabilizer. Examples of heat stabilizers typically used in, for example, polyamides are organic stabilizers, like phenolic antioxidants, organic phosphites and aromatic amines, and metal salts of Group IB, IIB, III and IV of the Periodic Table. Phenolic antioxidants and aromatic amines are generally used for stabilisation at elevated temperatures up to about 130° C. Frequently used metal salts are copper salts. Copper containing stabilizers are suitable for stabilisation at higher temperatures and have been available for many years.

Thermostabilized moulding composition comprising a thermoplastic polymer and a thermostabilizer and moulded articles for the electro, electronic and automotive industry made thereof, are known from and EP-0612794-B1. The thermoplastic polymer in the known composition of EP-0612794-B1 is an aliphatic or (semi-)aromatic polyamide. As one of the possible heat stabilizers in the known composition, ionic copper salts, such as copper iodide/potassium iodide, are mentioned. A disadvantage of the known composition comprising a copper salt as the heat stabilizer, is that the heat stability thereof is insufficient for more demanding applications involving exposure to higher temperatures. This problem has been solved in EP-0612794-B1 with compositions comprising, next to the copper salt, in-situ formed finely dispersed elementary copper. The finely dispersed elementary copper is said to be only effective as a heat stabiliser when it is prepared in-situ. When elementary copper prepared in advance of the melt-mixing process, in casu by using colloidal copper in a melt-mixing process for preparing a heat stabilised composition, the heat ageing performance of that composition was not essentially better than that of the copper iodide/potassium iodide containing composition, as noted in EP-0612794-B1. The known composition comprising in-situ prepared elementary copper is said in EP-0612794-B1 to have a much better resistance against thermal oxidation and influence of light than the copper salt/potassium iodide containing composition. The known materials have been tested at a temperature of 140° C.

In many applications for thermoplastic moulding compositions, retention of mechanical properties after long-term exposure to temperatures as high as 160° C., or even 180° C.-200° C. and higher becomes a basic requisite. The number of specialty applications, requiring improved heat ageing properties is also increasing. Therefore, there remains a need for further compositions having good or even further improved heat stability.

The aim of the invention is therefore to provide further moulding compositions having better heat ageing properties than the known compositions comprising a thermostabilizer selected from the group consisting of phenolic thermostabilizers, organic phosphites, aromatic amines and metal salts of elements from Group IB, IIB, III and IV of the Periodic Table.

This aim has been achieved with the composition according to the invention, wherein:
the thermoplastic polyamide composition (a) consists of a blend of at least two polyamides comprising
    a.1 at least 50 mass %, relative to the total mass of the thermoplastic polyamide composition, of a first polyamide (PA-1), being a semi-crystalline polyamide having a melting point Tm-1, or being an amorphous polyamide having a glass transition point Tg-1, wherein Tm-1 and Tg-1 together are denoted as T-1 and T-1 is at least 200° C.
    a.2. a second polyamide (PA-2), with a C/N ratio of at most 7, being a semi-crystalline polyamide having a melting point Tm-2 or an amorphous polyamide having a glass transition point Tg-2, wherein Tm-2 and Tg-2 together are denoted as T-2 and T-2 is at least 20° C. lower than T-1, and the moulding composition comprises, next to the thermostabilizer selected from the group consisting of phenolic thermostabilizers, organic phosphites, aromatic amines and metal salts of elements from Group IB, IIB, III and IV of the Periodic Table, (c) a metal oxide, or salt thereof, of a transition metal element from Group VB, VIB, VIIB and VIIIB of the Periodic Table, or a mixture thereof.

With the term melting temperature is herein understood the melting temperature measured according to ASTM D3417-97/D3418-97 by DSC with a heating rate of 10° C./minute and determined as the temperature with the highest melting enthalpy. With the term glass transition temperature is herein understood the temperature measured according to ASTM E 1356-91 by DSC with a heating rate of 20° C./minute and determined as the temperature at the peak of the first derivative (with respect of time) of the parent thermal curve corresponding with the inflection point of the parent thermal curve.

Surprisingly, the compositions according to the invention exhibit a very good retention of mechanical properties when exposed to very high temperature, in particular when exposed to temperatures which are even above the melting point Tm-2, or where applicable the glass transition point Tg-2, of the second polymer. Surprisingly, this retention is much better than for the corresponding known compositions comprising copper salts, but which do not comprise the second polyamide and the metal oxide, or salt thereof, as according to the invention. Furthermore, if one of the components, being either the said thermostabilizer, the second polyamide or the Group VB, VIB, VIIB or VIIIB metal oxide, or salt thereof, is left out, or if the second polymer is, for example, replaced by polyamide-11, i.e. a polyamide having a CN ratio of more than 7, the retention of mechanical properties is not significantly improved at all.

Thermostabilized thermoplastic moulding compositions comprising a blend of thermoplastic polyamides and a copper salt as the heat stabilizer are known from EP-0392602-A1. The known compositions from EP-0392602-A1 may optionally comprise a filler, which filler might be, among many others, iron oxide. Iron oxide is a metal oxid of a metal from Group VIIIB of the Periodic Table. The polyamides in the blend of thermoplastic polyamides of EP-0392602-A1 are, respectively polyamides with a C/N ratio in the range of 4 to 7 and polyamides with a C/N ratio more than 7. All the polyamides with a C/N ratio in the range of 4 to 7 that are mentioned in EP-0392602-A1 are polyamides with a higher melting point than the polyamides with a C/N ratio more than 7 mentioned in EP-0392602-A1. The blend of polyamides, more particular the admixture of the polyamide with a C/N ratio more than 7 and lower melting point to the polyamide with a C/N ratio in the range of 4 to 7 and higher melting point is applied in EP-0392602-A1 to improve the environmental stress cracking upon exposure to metallic halide compounds of the polyamide with the higher melting point. For obtaining good thermal stability copper salt is added. EP-0392602-A1 does not describe compositions comprising a blend of two thermoplastic polyamides, comprising one polyamide with a C/N ratio of at most 7 and a melting point, or, where applicable, a glass transition point, that is lower than the melting point or glass transition of the other polymer as according to the present invention. EP-0392602-A1 does not relate to the problem of insufficient thermal stability of copper salt containing polyamide compositions. EP-0392602-A1 neither mentions nor suggests a solution for that problem as according to the present invention.

Suitable metal oxides, or salts thereof, that can be used in the moulding composition according to the invention are metal oxides of a transition metal element from Group VB, VIB, VIIB and VIIIB of the Periodic Table, or a mixture thereof. These metals are further herein also denoted as "Group VB-VIIIB transition metals". These metals include the following metals: Group VB: vanadium (V), niobium (Nb), tantalum (Ta); Group VIB: chromium (Cr), molybdenum (Mo), and tungsten (W), Group VIIB: manganese (Mn), technetium (Tc) and rhenium (Re); and Group VIIIB: iron (Fe), ruthenium (Ru), osmium (Os), cobalt (Co), rhodium (Rh), iridium (Ir), nickel (Ni), palladium (Pd), and platinum (Pt).

The metal oxide of (c), or salt thereof, will be further herein referred to as metal oxide (c). Thus, unless indicated otherwise, the term metal oxide is to be interpreted as to include salts thereof as well.

Suitable salts of the metal oxide (c) are, for example, metal phosphates and metal hypophosphates, chlorides and acetates.

Preferably, the metal oxide (c) is an oxide, or salt thereof, of a metal chosen from the group consisting of V, Cr, Mo, W, Mn, Fe, Co, and Rh, or a mixture thereof, more preferably V, Mo, Fe and Co, and still more preferably Fe. Moulding compositions comprising metal oxides of these metals, or salts thereof, have even better thermal stability.

Suitable iron oxides include FeO, Fe2O3, or Fe3O4 or a mixture thereof. Suitable iron oxide salts include ferites, such as Zn-ferrite and Mg-ferrite, and iron phosphorus oxides, i.e. salts of iron oxides with phosphor based acids, like iron phosphate and ironhypophosphate.

Preferably, the Group VB-VIIIB transition metal oxide (c) comprises an iron oxide, a ferrite or an iron phosphorus oxide, or a mixture thereof, more preferably, FeO, Fe2O3, Fe3O4 or an iron phosphorus oxide, or a mixture thereof. The advantage of the inventive composition, wherein the Group VB-VIIIB transition metal oxide (c) comprises FeO, Fe2O3, Fe3O4, or an iron phosphorus oxide, or a mixture thereof, is that the heat ageing properties thereof are further improved. Still more preferably, Group VB-VIIIB transition metal oxide (c) is FeO, Fe2O3, or Fe3O4, or a mixture thereof. These oxides gives even better heat ageing properties.

Typically the metal oxide (c) in the composition according to the invention has a particulate form, preferably with a small particle size. Preferably, the metal oxide (c) comprises particles with a particle size of less than 1 mm, preferably less than 0.1 mm. Still more preferably, the metal oxide (c) has a median particle size ($D_{50}$) of at most 0.1 mm, more preferably at most 0.01 mm and still more preferably at most 0.001 mm. The advantage of a smaller particle size and in particular a smaller median article size for the metal oxide (c) is that the heat ageing properties of the inventive composition is further improved or that the metal oxide (c) can be used in a smaller amount for obtaining the same properties. The median particle size $D_{50}$ is determined with sieve methods, according to ASTM standard D1921-89, method A.

The metal oxide (c) can be present in the composition according to the invention in an amount varying over a wide range. The metal oxide (c) may for example be present in an amount of 20 mass %, relative to the total mass of the thermoplastic polyamide composition, or higher. Preferably the metal oxide (c) is present in an amount of 0.01-10 mass %, more preferably 0.05-4 mass %, relative to the total mass of the thermoplastic polyamide composition. A lower minimum amount results in a better heat ageing performance, very good results are already obtained at 0.6-2.4 mass % and an amount of over 10 mass % does not contribute to a significant further improvement.

For a good functioning of the Group VB-VIIIB transition metal oxide (c), the moulding composition according to the invention comprises the said thermostabilizer selected from the group consisting of phenolic thermostabilizers, organic phosphites, aromatic amines, metal salts of elements from Group IB, IIB, III and IV of the Periodic Table and metal halides of alkali and alkali earth metals, and combinations thereof.

Suitable, the thermostabilizer is present in an amount of 0.001-5 mass %, preferably 0.01-2 mass %, relative to the total mass of the thermoplastic polyamide composition.

A suitable phenolic thermostabilizer is, for example Irganox 1098, available from Ciba Specialty Chemicals. A suitable organic phosphate is, for example Irgafos 168 available from Ciba Specialty Chemicals. Examples of suitable metal salts are, for example, zinc chloride and zinc dithiocarbamates (like hostanox VPZnCS1), (zinc (Zn) is a Group IIB metal); tin chloride (tin (Sn) is a Group IV metal) and copper salts (copper (Cu) is a Group IB metal). Suitable copper salts are copper (I) and copper (II) salts, for example, copper phosphates, copper halides, and copper acetates. Suitable alkali metal halides are chlorides, bromides and iodides of lithium, sodium and potassium. Suitable alkali metal halides are chlorides, bromides and iodides of calcium.

Preferably, the thermostabilizer comprises a copper salt, more preferably a copper (I) salt, still more preferably a copper halide. Suitable halides include chloride, bromide and iodide.

Suitably, the moulding composition according to the invention comprises the copper salt in an amount of 0.001-3 mass %, preferably 0.01-1 mass %, relative to the total mass of the thermoplastic polyamide composition. Very suitably, the amount is around 0.05 mass %.

Also preferably, the thermostabilizer comprises a combination of metal salts of elements from Group IB, IIB, III and IV of the Periodic Table and metal halides of alkali and alkali earth metals, more preferably a combination of a copper salt and an alkali halide, still more preferably a copper (I) halide/alkalihalide combination. Suitable alkali ions include sodium and potassium. A suitable copper (I) halide/alkalihalide combination is, for example, CuI/KI.

Polyamides that can be used as the first polyamide (PA-1) in the moulding composition according to the invention can be any semi-crystalline polyamide with a melting point Tm-1 of at least 200° C. or amorphous polyamide with a glass transition point Tg-1 and T-1 is at least 200° C. Tm-1 and Tg-1 will be further herein denoted together as T-1. Suitable polyamides include aliphatic polyamides, like PA4,6 and PA6,6, and semi-aromatic polyamides and mixtures thereof.

Suitable semi-aromatic polyamides are, for example, PA-6,I, PA-6,I/6,6-copolyamide, PA-6,T, PA-6,T/6-copolyamide, PA-6,T/6,6-copolyamide, PA-6,I/6,T-copolyamide, PA-6,6/6,T/6,I-copolyamide, PA-6,T/2-MPMD,T-copolyamide (2-MPMD=2-methylpentamethylene diamine), PA-9,T, PA-9T/2-MOMD,T (2-MOMD=2-methyl-1,8-octamethylenediamine), Suitable semi-aromatic polyamides also include copolyamides obtained from terephthalic acid, 2,2,4- and 2,4,4-trimethylhexamethylenediamine, copolyamide obtained from isophthalic acid, laurinlactam and 3,5-dimethyl-4,4-diaminodicyclohexylmethane, copolyamides obtained from isophthalic acid, azelaic acid and/or sebacic acid and 4,4-diaminodicyclohexylmethane, copolyamides obtained from caprolactam, isophthalic acid and/or terephthalic acid and 4,4-diaminodicyclohexylmethane, copolyamides obtained from caprolactam, isophthalic acid and/or terephthalic acid and isophoronediamine, copolyamides obtained from isophthalic acid and/or terephthalic acid and/or other aromatic or aliphatic dicarboxylic acids, optionally alkyl-substituted hexamethylenediamine and alkyl-substituted 4,4-diaminodicyclohexylamine, and copolyamides of the aforementioned polyamides, provided they have a T-1 of at least 200° C.

Polyamides that can be used as the second polyamide (PA-2) in the moulding composition according to the invention can be any semi-crystalline polyamide with a melting point Tm-2 that is at least 20° C. lower than T-1 and any amorphous polyamide with a glass transition point Tg-2 that is at least 20° C. lower than T-1 and wherein the polyamide has a C/N ratio of at most 7. Tm-2 and Tg-2 will be further herein denoted together as T-2.

With the expression that the first polyamide has a T-1, being either the melting point or where applicable the glass transition point, of at least 200° C., while the second polyamide has a T-1, being either the melting point or where applicable the glass transition point, of at least 20° C. lower than T-1, is meant that T-2 might as well be 200° C. or higher provided that T-1 is high enough, i.e. if T-1 is 270° C., T-2 may be as high as 250° C.

Suitable aliphatic polyamides that can be used as the second polyamide (PA-2) are, for example, aliphatic polyamides like PA-6 and PA-6,6, and copolymers of PA-6 and PA-6,6, as well as copolymers of PA-6 and PA-6,6 with for example, PA-4,6, PA-4,8, PA-4,10, PA-4,12, PA-6,6, PA-6,9, PA-6,10, PA-6,12, PA-10,10, PA-12,12, PA-6/6,6-copolyamide, PA-6/12-copolyamide, PA-6/11-copolyamide, PA-6,6/11-copolyamide, PA-6,6/12-copolyamide, PA-6/6,10-copolyamide, PA-6,6/6,10-copolyamide, PA-4,6/6-copolyamide, PA-6/6,6/6,10-terpolyamide, and copolyamides obtained from 1,4-cyclohexanedicarboxylic acid and 2,2,4- and 2,4,4-trimethylhexamethylenediamine, provided the copolyamide has a C/N ratio of at most 7 and the requirement that T-2 is at least 20° C. lower than T-1 of the first polyamide.

Suitable semi-aromatic polyamides that can be used as the second polyamide (PA-2) are, for example, copolyamides of PA-6 and PA-6,6 and any of the semi-aromatic polyamides mentioned above for the first polyamide (PA-1), provided these semi-aromatic copolyamide has a C/N ratio of at most 7 and the requirement that T-2 is at least 20° C. lower than T-1 of the first polyamide.

Preferably the second polyamide is an aliphatic polyamide, more preferably the aliphatic polyamide is PA-6 or a copolymer thereof, and still more preferably the second polyamide is PA-6.

In a preferred embodiment of the invention the first polyamide T-1 is at least 220° C., preferably at least 240° C., and still more preferably at least 260° C. The first polyamide having a higher T-1 has the advantage that the moulding composition can be used for applications involving even higher temperatures.

In another preferred embodiment of the invention, T-2 of the second polyamide is at least 30° C., preferably at least 40° C., more preferably at least 50° C. lower than T-1.

In a further preferred embodiment of the invention the second polyamide is present in an amount of 1-50 mass %, preferably 2.5-40 mass %, more preferably 5-30 mass %, and still more preferably 10-20 mass %, relative to the total mass of the thermoplastic polyamide composition. A lower maximum content of the second polyamide in the moulding composition according to the invention is advantageous for obtaining higher initial mechanical properties for the moulding composition. A higher minimum content results in better retention of the mechanical properties upon prolonged exposure of the moulding composition to elevated temperatures.

The thermoplastic polyamide composition in the moulding composition according to the invention may, next to the first and second polyamide, optionally comprise one or more further polyamides, for example a polyamide with a melting temperature or glass transition temperature falling in between T-1 and T-2, or a polyamide with a low melting temperature or glass transition temperature falling in the range of T-2 and a high C/N ratio higher than 7. Preferably, the thermoplastic polyamide composition only consists of a blend of the first polyamide (PA-1) and the second polyamide (PA-2).

Apart from the thermoplastic polyamide composition (a) the copper salt (b) and the Group VB-VIIIB transition metal oxide (c), the moulding composition according to the invention may comprise further components, like reinforcing agents, fillers, flame retardants, pigments, and other auxiliary additives like plasticizers, processing aids, such as mould release agents, further stabilizers such as antioxidants and UV stabilizers, crystallization accelerating agents or nucleating agents, impact modifiers and compatibilizers. The moulding composition according to the invention may further comprise deliquescent substances, such as sodium chloride, and/or additional contributing stabilizing components such as hypophosphates like disodiumdihydrogen-hypophosphate.

These further components may comprise polymer components, for example a polymer that is used as a carrier for the metal oxide (c) or for a pigment, a halogenated polymeric flame retardant, or a rubber that is used, for example as an impact modifier.

As reinforcing agent for the inventive moulding composition commercially available glass fibres, mineral fibres and carbon fibres, optionally surface treated for polyamides, can be used. Reinforcing agents can be used in an amount varying over a wide range, for example, from 5-300 mass % relative to the total mass of the thermoplastic polyamide composition. Suitably, the reinforcing agent is present in an amount of 10-200 mass %, preferably 25-100 mass %, relative to the total mass of the thermoplastic polyamide composition.

Suitable fillers that can be used in the moulding composition according to the invention include commercial fillers and inorganic minerals, like kaolin, wolastonite, mica, calciumcarbonate, and nano-fillers, optionally surface modified for polyamides. Fillers can be used in an amount varying over a wide range, for example, from 5-300 mass % relative to the total mass of the thermoplastic polyamide composition. Suitably, the filler is present in an amount of 10-200 mass %, preferably 25-100 mass %, relative to the total mass of the thermoplastic polyamide composition.

Suitable flame retardants include both halogen containing flame retardants and halogen free flame retardants. Preferably the flame retardants are selected from those types that do not detract form the heat ageing properties of the moulding composition according to the invention.

Preferably the total amount of fibre reinforcing agents, fillers and flame retardants is in the range of 0-300 mass %, more preferably 25-200 mass %, relative to the total mass of the thermoplastic polyamide composition (a).

Suitable pigments that can be used in the moulding composition according to the invention include black pigments like carbon black and nigrosine, which are preferably used in an amount of 0.01-5 mass %, more preferably 0.1-1 mass %, relative to the total mass of the thermoplastic polyamide composition.

The other auxiliary additives, apart from reinforcing agents, fillers, flame retardants and pigments, are preferably used in an amount of at most 20 mass %, relative to the total mass of the thermoplastic polyamide composition.

In a preferred mode of the invention, the moulding composition consists of
a) a blend of 50-99 mass % PA-1 and 1-50 mass % PA-2, relative to the total amount of the thermoplastic polyamide composition,
b) 0.001-3 mass % thermostabilizer selected from the group consisting of phenolic thermostabilizers, organic phosphites, aromatic amines and metal salts of elements from Group IB, IIB, III and IV of the Periodic Table,
c) 0.05-10 mass % Group VB-VIIIB metal oxide, or salt thereof,
d) 0-200 mass % fibrous reinforcing agent,
e) 0-200 mass % filler,
f) 0-100 mass % flame retardant, wherein the total of d), e) and f) is 0-300 mass %,
g) 0-5 mass % black pigment, and
h) 0-20 mass % of other additives,
wherein the mass % of b)-h) are relative to the total mass of the thermoplastic polyamide composition (a).

In a more preferred embodiment, the inventive moulding composition is a fiber reinforced moulding composition consisting of
a) a blend of 60-97.5 mass % PA-1 and 2.5-40 mass % PA-2, with PA-1 and PA-2 making up for 100 mass % of the thermoplastic polyamide composition,
b) 0.01-1 mass % copper salt,
c) 0.1-4 mass % iron oxide, or salt thereof,
d) 10-200 mass % fibrous reinforcing agent,
e) 0-100 mass % filler,
f) 0-50 mass % flame retardant, wherein the total of d), e) and f) is 10-250 mass %,
g) 0-5 mass % black pigment, chosen form carbon black, nigrosine and iron black, and
h) 0-20 mass % of other additives,
wherein the mass % of b)-h) are relative to the total mass of the thermoplastic polyamide composition (a).

In a still more preferred embodiment, the inventive moulding composition is a fiber reinforced moulding composition consisting of
a) a blend of 30-95 mass % PA-1 and 5-30 mass % PA-2, with PA-1 and PA-2 making up for 100 mass % of the thermoplastic polyamide composition,
b) 0.01-1 mass % copper salt,
c) 0.1-4 mass % Group VB-VIIIB metal oxide, or salt thereof,
d) 20-200 mass % fibrous reinforcing agent,
e) 0-100 mass % filler, wherein the total of d) and e) is 20-200 mass %,
f) 0.1-5 mass % black pigment chosen form carbon black and nigrosine, and
g) 0-20 mass % of other additives, not including a flame retardant,
wherein the mass % of b)-h) are relative to the total mass of the thermoplastic polyamide composition (a).

The invention also relates to the use of a metal oxide, or salt thereof, as a heat stabilizer in preparing thermostabilized thermoplastic polyamide moulding compositions. According to the invention the metal oxide, or salt thereof, is a metal oxide, or salt thereof, of a transition metal element from Group VB, VIB, VIIB and VIIIB of the Periodic Table, or a mixture thereof, or any of the preferred embodiments thereof as described above.

The invention also relates to the use of a composition according to the invention for making moulded parts for high-temperature applications involving a use temperature of at least 150° C.

These moulded parts may be made by any process that is suitable for making moulded parts from thermoplastic moulding compounds. Suitably, these moulded parts can be made by a process comprising feeding the composition according to the invention, or any preferred embodiments thereof, as such or in the form of separate components a), b) and c), and optionally further ingredients, to a moulding machine.

Optionally, the Group VB-VIIIB transiotion metal oxides, or salt thereof, is added as such, or as a masterbatch in a carrier polymer and a) and b), and optionally further ingredients, are fed in the form of a pre-blend or a precompounded granulate.

The invention also relates to a moulded part consisting of a composition according to the invention. The moulded part may, for example, be an automotive part or engine part (such as an exhaust system part, a bearing, a gear box, an engine cover, an air duct, an intake manifold, an intercooler end-cap, a castor, or a trolley part). or an electric or electronic part (such as connectors, bolts and coil bobbins).

The invention also relates to the use of a moulded part according to the invention in an assembly process for making an automotive engine, a machine, or an electrical or electronic installation.

The invention furthermore relates to products, including automotive vehicles, general transport means, domestic appliances, and general industry installations, electric and electronic installations, comprising a moulded part according to the invention. The advantage is that the service life time of the said products in respect deterioration of the moulded part due to exposure to elevated temperature, is longer and/or replacement of the said moulded part can be delayed and/or that the product can be operated at higher temperature, compared with a product comprising a moulded part made of the corresponding known composition comprising a single polyamide and a copperiodide/potassium iodide stabilizing system.

The invention is further elucidated with the following examples and comparative experiments.

Materials

| | |
|---|---|
| PA-1 | PA46: Polyamide-4,6, type KS 200, viscosity number 160 ml/g (measured according to ISO 307), (ex DSM, The Netherlands) |
| PA-2 | PA46/6 (g mass % PA6 copolymer units), type KS411 (ex DSM, The Netherlands) |
| PA-3 | PA46: Polyamide-4,6, type KS 300; viscosity number 205 ml/g (measured according to ISO 307), (ex DSM, The Netherlands) |
| PA-4 | PA-6: Polyamide 6, type K122, viscosity number 115 ml/g (measured according to ISO 307) (ex DSM, The Netherlands) |
| PA-5 | PA-11: Rilsan BM140 (ex Atochem, France) |
| PA-6 | PA6/66 (85/15); Tm 198° C.; Ultramid C35 (ex BASF) |
| Cu-stab | Copper stabilizer: CuI/KI (10 mass % CuI) |
| FeOX | Iron oxide $Fe_2O_3$, (Sicotrans Red, K2915, $D_{50}$ = 400 nm) (ex BASF) |

Moulding Compounds

The compositions of Example I and Comparative Experiments A-F (glass fiber reinforced moulding compositions, series I, Table 1) and Example II-III and Comparative Experiments G-L (non-reinforced moulding compositions, series II, Table 2) were prepared using a ZSK 25 twin-screw extruder (ex Werner & Fleiderer). The cylinder temperature of the extruder was 300° C., rotation speed of the screws 275 RPM and the throughput 20 kg/hour. All ingredients except the reinforcing agent were added via a hopper at the throat. The reinforcing agent was added to the melt by side dosing. The compounded material was extruded in the form of strands, cooled in a water bath and cut into granules. The resulting granulate was dried for 16 hours at 105° C. under vacuum.

The dried granulate was injection moulded on an injection moulding machine type 75 (ex Engel) with a screw diameter of 22 mm in the form of test bars with a thickness of 4 mm and conforming ISO 527 type 1A. The temperature of the melt in the injection-moulding machine was 315° C.; the temperature of the mould was 120° C.

Ageing Tests

The test bars were heat-aged in a Vötsh oven (type NT4 60/60) or GRENCO oven (type:GTTS 125 00 S) at 230° C. for series I (Ex. I and CE A-F) and at 240° C. for series II (Ex. II-III and CE G-L). After a certain heat ageing time, the test bars were taken out the oven, left to cool to room temperature, visually inspected and tested with respect to the mechanical properties by means of a tensile test according ISO 527 at 23° C.

The compositions and typical test results after heat ageing have been collected in Tables 1 and 2. The values for the modulus and tensile strength before heat ageing for the materials of series I were all around 8000-8500 MPa and 140-180 MPa, respectively.

TABLE I

Compositions of glass reinforced polyamide moulding compositions (amounts in parts by weight) and mechanical properties thereof after ageing at 230° C.

| | Experiments | | | | | | |
|---|---|---|---|---|---|---|---|
| Components | CE-A | CE-B | CE-C | CE-D | CE-E | CE-F | EX-1 |
| PA-1 (PA46) | 100 | 75 | 100 | 75 | 75 | — | 75 |
| PA-2 | — | — | — | — | — | 100 | — |
| PA-4 | — | 25 | — | — | 25 | — | 25 |
| PA-5 | — | — | — | 25 | — | — | — |
| CuI/KI | 0.74 | 0.74 | 0.74 | 0.74 | — | 0.74 | 0.74 |
| FeOX | — | — | 0.6 | 0.6 | 0.6 | 0.6 | 0.6 |
| Glass fibers | 34 | 34 | 34 | 34 | 34 | 34 | 34 |
| Mechanical properties after 1000 hours at 230° C. | | | | | | | |
| Tensile strength (MPa) | 5 | 20 | c.e. | 30 | 5 | c.e. | 95 |
| Modulus (MPa) | 1500 | 5200 | c.e. | 4000 | n.c.e. | c.e. | 9200 |

TABLE I-continued

Compositions of glass reinforced polyamide moulding compositions (amounts in parts by weight) and mechanical properties thereof after ageing at 230° C.

| Components | CE-A | CE-B | CE-C | CE-D | CE-E | CE-F | EX-1 |
|---|---|---|---|---|---|---|---|
| Mechanical properties (in MPa) after 2000 hours at 230° C. | | | | | | | |
| Tensile strength (MPa) | c.e. | c.e. | c.e. | c.e. | c.e. | c.e. | 90 |
| Modulus (MPa) | c.e. | c.e. | c.e. | c.e. | c.e. | c.e. | 9200 | c.e. = completely embrittled; impossible to properly measure the mechanical properties;
n.c.e. = nearly completely embrittled; impossible to properly measure the modulus.

TABLE II

Compositions of non-reinforced polyamide moulding compositions (amounts in parts by weight) and testing results thereof after ageing at 240° C.

| Components | CE-G | CE-H | CE-J | CE-K | CE-L | EX-II | EX-III |
|---|---|---|---|---|---|---|---|
| PA-3 | 100 | 100 | 87.5 | 74.5 | 93.7 | 93.75 | 87.5 |
| PA-4 | — | — | 12.5 | — | — | — | 12.5 |
| PA-5 | — | — | — | 25.5 | — | — | — |
| PA-6 | — | — | — | — | 6.25 | 6.25 | — |
| Cu-stab | 0.74 | 0.74 | 0.74 | 0.74 | 0.74 | 0.74 | 0.74 |
| FeOX | — | 0.6 | — | — | — | 0.6 | 0.6 |
| Appearance after 1000 hours at 240° C. | | | | | | | |
| | C.E. | C.E. | C.E. | C.E. | C.E. | Pass | Pass |

C.E. = complete embrittlement;
Pass = no visible surface cracks

The invention claimed is:

1. A thermostabilized thermoplastic moulding composition comprising:
    a) a thermoplastic polyamide composition which consists of a blend of at least two polyamides comprising:
        a1) at least 50 mass %, relative to the total mass of the thermoplastic polyamide composition, of a first polyamide (PA-1) selected from the group consisting of polyamide-4,6, polyamide-6,6 and semi-aromatic polyamides and mixtures thereof; and
        a2) an amount of 1-50 mass %, relative to the total mass of the thermoplastic polyamide composition, of a second polyamide (PA-2) selected from the group consisting of polyamide-6 and copolymers thereof;
    b) 0.001-3 mass %, relative to the total mass of the thermoplastic polyamide composition, of a copper salt; and
    c) 0.01-10 mass %, relative to the total mass of the thermoplastic polyamide composition, of iron oxide, wherein the moulding composition exhibits reduced deterioration when exposed to an elevated temperature of 230° C. for a prolonged time period of 1000 hours as compared to an identical moulding composition including a CuI/KI stabilization system but not including the iron oxide.

2. The moulding composition as in claim 1, wherein the copper salt is a copper halogenide/alkalihalogenide combination.

3. The moulding composition as in claim 2, wherein the copper salt is CuI/KI.

4. The moulding composition as in claim 1, the iron oxide comprises particles with a particle size of less than 1 mm.

5. The moulding composition as in claim 4, wherein the particle size of the iron oxide particles is less than 0.1 mm.

6. The moulding composition as in claim 1, wherein the iron oxide comprises particles having a median particle size ($D_{50}$) of at most 0.01 mm.

7. The moulding composition as in claim 6, wherein the median particle size ($D_{50}$) of the iron oxide particles is at most 0.001 mm.

8. A moulded part which comprises the moulding composition according to any one of claims 1-3 and 4-7.

* * * * *